United States Patent
Pang et al.

(10) Patent No.: US 6,851,867 B2
(45) Date of Patent: Feb. 8, 2005

(54) CAM-FOLLOWER RELEASE MECHANISM FOR FIBER OPTIC MODULES WITH SIDE DELATCHING MECHANISMS

(75) Inventors: Ron Cheng Chuan Pang, Singapore (SG); Kee-Sin Tan, Westlake Village, CA (US); Kah Yuan Phang, Malaysia (MY)

(73) Assignee: JDS Uniphase Corporation, San Jose, CA (US)

( * ) Notice: Subject to any disclaimer, the term of this patent is extended or adjusted under 35 U.S.C. 154(b) by 75 days.

(21) Appl. No.: 10/452,473

(22) Filed: May 30, 2003

(65) Prior Publication Data

US 2004/0033027 A1 Feb. 19, 2004

Related U.S. Application Data

(63) Continuation-in-part of application No. 09/939,403, filed on Aug. 23, 2001, now Pat. No. 6,692,159, and a continuation-in-part of application No. 09/896,695, filed on Jun. 28, 2001.
(60) Provisional application No. 60/313,232, filed on Aug. 16, 2001, and provisional application No. 60/283,843, filed on Apr. 14, 2001.

(51) Int. Cl.$^7$ .............................. G02B 6/36; G02B 6/38; G02B 6/00
(52) U.S. Cl. ............................ 385/88; 385/56; 385/59; 385/134
(58) Field of Search ..................................... 385/53–84

(56) References Cited

U.S. PATENT DOCUMENTS

| | | | |
|---|---|---|---|
| 1,835,251 | A | 12/1931 | Wetstein |
| 1,899,360 | A | 2/1933 | Roudebush et al. |
| 2,384,267 | A | 9/1945 | Anderson et al. |

(List continued on next page.)

FOREIGN PATENT DOCUMENTS

| | | |
|---|---|---|
| GB | 2 297 007 A | 7/1996 |
| JP | 07 225327 | 8/1995 |
| JP | 07 225328 | 8/1995 |
| WO | WO 95 12227 | 5/1995 |

OTHER PUBLICATIONS

US 6,554,622, 4/2003, Engel et al. (withdrawn)
Nagesh R. Basavanhally, et al., "Optoelectronic Packaging", Chapter 2, Communication System Interconnection Structure, pp. 11–23, 38–43, John Wiley & Sons, Inc., New York, NY.
Shinichi Sasaki, A Compact Optical Active Connector: An Optical Interconnect Module with an Electrical Connector Interface, IEEE Translations on Advanced Packaging, pp. 541–550, vol. 22, No. 4, Nov. 1999.

*Primary Examiner*—Tarifur R. Chowdhury
*Assistant Examiner*—Richard H Kim
(74) *Attorney, Agent, or Firm*—Allen, Dyer, Doppelt, Milbrath & Gilchrist, P.A.

(57) ABSTRACT

A cam-follower release mechanism for fiber optic modules with side releases. The cam-follower release mechanism translates rotational motion into linear motion. The release mechanism has a rotatable bail lever with a cam lobe that pivots about a pivot point and presses against a bearing surface of the fiber optic module. The release mechanism further has a base with a pin about with the rotatable bail lever may pivot and a sliding fork with sliding side actuators and delatch actuators at each end. As a follower, the base and sliding fork is linearly pulled as the rotatable bail lever is rotated. As the sliding fork is pulled out, the delatch actuators at each end push in on side tabs of a cage into which the fiber optic module may be inserted. The release mechanism further has a spring to apply a force against the rotation of the rotatable bail lever to return it to home and retain the release mechanism moveable coupled to the fiber optic module. The fiber optic module further includes optoelectronic devices mounted to a printed circuit board, and a housing.

20 Claims, 9 Drawing Sheets

U.S. PATENT DOCUMENTS

| | | |
|---|---|---|
| 2,714,195 A | 7/1955 | Beatty |
| 2,760,174 A | 8/1956 | Burtt et al. |
| 2,767,008 A | 10/1956 | Oswald |
| 2,872,139 A | 2/1959 | Bedford, Jr. |
| 2,881,404 A | 4/1959 | Kamm |
| 2,899,669 A | 8/1959 | Johanson |
| 3,017,232 A | 1/1962 | Schwab et al. |
| 3,035,243 A | 5/1962 | Bowling |
| 3,311,863 A | 3/1967 | Beale |
| 3,398,390 A | 8/1968 | Long |
| 3,408,614 A | 10/1968 | Kuwahata |
| 3,451,034 A | 6/1969 | Beale |
| 3,476,258 A | 11/1969 | Dorsett |
| 3,495,206 A | 2/1970 | Pfister |
| 3,518,612 A | 6/1970 | Dunman et al. |
| 3,566,190 A | 2/1971 | Huebner et al. |
| 3,566,336 A | 2/1971 | Johnson et al. |
| 3,576,515 A | 4/1971 | Frantz |
| 3,594,698 A | 7/1971 | Anhalt |
| 3,668,605 A | 6/1972 | Albert |
| 3,736,471 A | 5/1973 | Donz et al. |
| 3,767,974 A | 10/1973 | Donoban, Jr. et al. |
| 3,784,954 A | 1/1974 | Grimm et al. |
| 3,798,507 A | 3/1974 | Damon et al. |
| 3,803,409 A | 4/1974 | Prochazka |
| 3,806,225 A | 4/1974 | Clanton |
| 3,809,908 A | 5/1974 | Medina, Jr. |
| 3,915,538 A | 10/1975 | Gruhn et al. |
| 3,950,059 A | 4/1976 | Anhalt et al. |
| 3,951,514 A | 4/1976 | Medina, Jr. |
| 3,952,232 A | 4/1976 | Coules |
| 4,045,109 A | 8/1977 | Langenbach et al. |
| 4,064,551 A | 12/1977 | Lightfoot |
| 4,070,081 A | 1/1978 | Takahashi |
| 4,083,616 A | 4/1978 | McNiece et al. |
| 4,083,619 A | 4/1978 | McCormick et al. |
| 4,084,882 A | 4/1978 | Hogan et al. |
| 4,140,367 A | 2/1979 | Makuch et al. |
| 4,149,072 A | 4/1979 | Smith et al. |
| 4,152,038 A | 5/1979 | Inouye et al. |
| 4,167,303 A | 9/1979 | Bowen et al. |
| 4,197,572 A | 4/1980 | Aimar |
| 4,217,030 A | 8/1980 | Howarth |
| 4,226,491 A | 10/1980 | Kazama et al. |
| 4,233,646 A | 11/1980 | Leung et al. |
| 4,243,283 A | 1/1981 | McSparraan |
| 4,260,210 A * | 4/1981 | Babuka et al. ............... 439/347 |
| 4,268,114 A | 5/1981 | dAuria et al. |
| 4,273,413 A | 6/1981 | Bendiksen et al. |
| 4,295,181 A | 10/1981 | Chang et al. |
| 4,301,494 A | 11/1981 | Jordan |
| 4,313,150 A | 1/1982 | Chu |
| 4,377,318 A | 3/1983 | Long |
| 4,384,368 A | 5/1983 | Rosenfeldt et al. |
| 4,387,956 A | 6/1983 | Cline |
| 4,398,073 A | 8/1983 | Botz et al. |
| 4,406,514 A | 9/1983 | Hillegonds et al. |
| 4,410,222 A | 10/1983 | Enomoto et al. |
| 4,427,879 A | 1/1984 | Becher et al. |
| 4,432,604 A | 2/1984 | Schwab |
| 4,439,006 A | 3/1984 | Stevenson |
| 4,445,740 A | 5/1984 | Wallace |
| 4,448,467 A | 5/1984 | Weidler |
| 4,449,784 A | 5/1984 | Basov et al. |
| 4,460,230 A | 7/1984 | McKee et al. |
| 4,470,660 A | 9/1984 | Hillegonds et al. |
| 4,477,133 A | 10/1984 | Cosmo |
| 4,477,146 A | 10/1984 | Bowen et al. |
| 4,491,981 A | 1/1985 | Weller et al. |
| 4,522,463 A | 6/1985 | Schwenda et al. |
| 4,526,427 A | 7/1985 | Boll et al. |
| 4,527,285 A | 7/1985 | Kekas et al. |
| 4,541,036 A | 9/1985 | Landries et al. |
| 4,548,467 A | 10/1985 | Stoerk et al. |
| 4,553,813 A | 11/1985 | McNaughton et al. |
| 4,553,814 A | 11/1985 | Bahl et al. |
| 4,611,887 A | 9/1986 | Glover et al. |
| 4,619,493 A | 10/1986 | Kikuta |
| 4,678,264 A | 7/1987 | Bowen et al. |
| 4,684,210 A | 8/1987 | Matsunaga et al. |
| 4,699,438 A | 10/1987 | Kikuta |
| 4,699,455 A | 10/1987 | Erbe et al. |
| 4,734,049 A | 3/1988 | George et al. |
| 4,737,008 A | 4/1988 | Ohyama et al. |
| 4,756,593 A | 7/1988 | Koakutsu et al. |
| 4,762,388 A | 8/1988 | Tanaka et al. |
| 4,767,179 A | 8/1988 | Sampson et al. |
| 4,779,950 A | 10/1988 | Williams |
| 4,787,706 A | 11/1988 | Cannon, Jr. et al. |
| 4,789,218 A | 12/1988 | Paul et al. |
| 4,798,430 A | 1/1989 | Johnson et al. |
| 4,798,440 A | 1/1989 | Hoffer et al. |
| 4,821,145 A | 4/1989 | Corfits et al. |
| 4,838,810 A | 6/1989 | Yoshimura et al. |
| 4,840,451 A | 6/1989 | Sampson et al. |
| 4,861,134 A | 8/1989 | Alameel et al. |
| 4,872,736 A | 10/1989 | Myers et al. |
| 4,900,263 A | 2/1990 | Manassero et al. |
| 4,906,197 A | 3/1990 | Noll |
| 4,944,568 A | 7/1990 | Danbach et al. |
| 4,960,317 A | 10/1990 | Briggs et al. |
| 4,969,924 A | 11/1990 | Suverison et al. |
| 4,986,625 A | 1/1991 | Yamada et al. |
| 4,991,062 A | 2/1991 | Nguyenngoc |
| 4,995,821 A | 2/1991 | Casey |
| 4,997,386 A | 3/1991 | Kawachi et al. |
| 5,005,939 A | 4/1991 | Arvanitakis et al. |
| 5,011,425 A | 4/1991 | VanZanten et al. |
| 5,013,247 A | 5/1991 | Watson |
| 5,016,968 A | 5/1991 | Hammond et al. |
| 5,021,003 A | 6/1991 | Ohtaka et al. |
| 5,039,194 A | 8/1991 | Block et al. |
| 5,042,891 A | 8/1991 | Mulholland et al. |
| 5,044,982 A | 9/1991 | Bertini |
| 5,062,806 A | 11/1991 | Ohno et al. |
| 5,067,785 A | 11/1991 | Schirbl et al. |
| 5,071,219 A | 12/1991 | Yurtin et al. |
| 5,073,045 A | 12/1991 | Abenschein |
| 5,073,046 A | 12/1991 | Edwards et al. |
| 5,076,656 A | 12/1991 | Briggs et al. |
| 5,082,344 A | 1/1992 | Mulholland et al. |
| 5,083,931 A | 1/1992 | Davidge et al. |
| 5,084,802 A | 1/1992 | Nguyenngoc |
| 5,091,991 A | 2/1992 | Briggs et al. |
| 5,099,307 A | 3/1992 | Go et al. |
| 5,101,463 A | 3/1992 | Cubukciyan et al. |
| 5,104,243 A | 4/1992 | Harding |
| 5,109,453 A | 4/1992 | Edwards et al. |
| 5,113,467 A | 5/1992 | Peterson et al. |
| 5,116,239 A | 5/1992 | Siwinski |
| 5,117,476 A | 5/1992 | Yingst et al. |
| 5,118,904 A | 6/1992 | Nguyenngoc |
| 5,125,849 A | 6/1992 | Briggs et al. |
| 5,134,679 A | 7/1992 | Robin et al. |
| 5,138,678 A | 8/1992 | Briggs et al. |
| 5,140,663 A | 8/1992 | Edwards et al. |
| 5,142,597 A | 8/1992 | Mulholland et al. |
| 5,155,786 A | 10/1992 | Ecker et al. |
| 5,159,652 A | 10/1992 | D'Alphonse et al. |
| 5,163,109 A | 11/1992 | Okugawa et al. |
| 5,163,847 A | 11/1992 | Regnier |

| | | | | | | |
|---|---|---|---|---|---|---|
| 5,183,404 A | 2/1993 | Aldous et al. | | 5,829,996 A | 11/1998 | Yamane et al. |
| 5,195,897 A | 3/1993 | Kent et al. | | 5,864,468 A | 1/1999 | Poplawski et al. |
| 5,195,911 A | 3/1993 | Murphy | | 5,865,646 A | 2/1999 | Ortega et al. |
| 5,199,093 A | 3/1993 | Longhurst | | 5,879,173 A | 3/1999 | Poplawski et al. |
| 5,204,929 A | 4/1993 | Machall et al. | | 5,896,480 A | 4/1999 | Scharf et al. |
| 5,212,681 A | 5/1993 | Bock et al. | | 5,901,263 A * | 5/1999 | Gaio et al. .................... 385/92 |
| 5,212,761 A | 5/1993 | Petrunia | | 5,931,290 A | 8/1999 | Wehrli, III et al. |
| 5,218,519 A | 6/1993 | Welch et al. | | 5,966,487 A | 10/1999 | Gilliland et al. |
| 5,234,353 A | 8/1993 | Scholz et al. | | 5,980,324 A | 11/1999 | Berg et al. |
| 5,238,426 A | 8/1993 | Arnett | | 6,047,172 A | 4/2000 | Babineau et al. |
| 5,243,678 A | 9/1993 | Schaffer et al. | | 6,052,278 A | 4/2000 | Tanzer et al. |
| 5,247,427 A | 9/1993 | Driscoll et al. | | 6,062,893 A | 5/2000 | Miskin et al. |
| 5,253,320 A | 10/1993 | Takahashi et al. | | 6,074,228 A | 6/2000 | Berg et al. |
| 5,256,080 A | 10/1993 | Bright | | 6,085,006 A | 7/2000 | Gaio et al. |
| 5,259,052 A | 11/1993 | Briggs et al. | | RE36,820 E | 8/2000 | McGinley et al. |
| 5,262,923 A | 11/1993 | Batta et al. | | 6,101,087 A | 8/2000 | Sutton et al. |
| 5,274,729 A | 12/1993 | King et al. | | 6,142,802 A | 11/2000 | Berg et al. |
| 5,283,680 A | 2/1994 | Okugawa et al. | | 6,142,828 A | 11/2000 | Pepe |
| 5,286,207 A | 2/1994 | McHugh | | 6,149,465 A | 11/2000 | Berg et al. |
| 5,289,345 A | 2/1994 | Corradetti et al. | | 6,178,096 B1 | 1/2001 | Flickinger et al. |
| 5,295,212 A | 3/1994 | Morton et al. | | 6,179,627 B1 | 1/2001 | Day et al. |
| 5,315,679 A | 5/1994 | Baldwin et al. | | 6,186,670 B1 | 2/2001 | Austin et al. |
| 5,317,663 A | 5/1994 | Beard et al. | | 6,190,054 B1 | 2/2001 | Tamaki et al. |
| 5,325,454 A | 6/1994 | Rittle et al. | | 6,200,041 B1 | 3/2001 | Gaio et al. |
| 5,325,455 A | 6/1994 | Henson et al. | | 6,201,704 B1 | 3/2001 | Poplawski et al. |
| 5,329,428 A | 7/1994 | Block et al. | | 6,203,333 B1 | 3/2001 | Medina et al. |
| 5,329,604 A | 7/1994 | Baldwin et al. | | 6,206,582 B1 | 3/2001 | Gilliland |
| 5,333,221 A | 7/1994 | Briggs et al. | | 6,220,873 B1 | 4/2001 | Samela et al. |
| 5,337,396 A | 8/1994 | Chen et al. | | 6,220,878 B1 | 4/2001 | Poplawski et al. |
| 5,361,318 A | 11/1994 | Go et al. | | 6,226,188 B1 | 5/2001 | Warren |
| 5,363,465 A | 11/1994 | Korkowski et al. | | 6,229,708 B1 | 5/2001 | Corbin, Jr. et al. |
| D353,796 S | 12/1994 | Oliver et al. | | 6,231,145 B1 | 5/2001 | Liu |
| D354,271 S | 1/1995 | Speiser et al. | | 6,241,534 B1 | 6/2001 | Neer et al. |
| 5,383,793 A | 1/1995 | Hsu et al. | | 6,267,606 B1 | 7/2001 | Poplawski et al. |
| 5,386,346 A | 1/1995 | Gleadall | | D446,501 S | 8/2001 | Donnell et al. |
| 5,390,268 A | 2/1995 | Morlion et al. | | 6,276,943 B1 | 8/2001 | Boutros et al. |
| 5,398,295 A | 3/1995 | Chang et al. | | 6,304,436 B1 | 10/2001 | Branch et al. |
| 5,411,402 A | 5/1995 | Betnurum | | 6,317,329 B1 | 11/2001 | Dowdy et al. |
| 5,412,497 A | 5/1995 | Kaetsu et al. | | 6,335,869 B1 | 1/2002 | Branch et al. |
| 5,425,646 A | 6/1995 | Green | | 6,341,899 B1 | 1/2002 | Shirakawa et al. |
| 5,442,726 A | 8/1995 | Howard et al. | | 6,350,063 B1 | 2/2002 | Gilliland et al. |
| 5,452,388 A | 9/1995 | Rittle et al. | | 6,358,082 B1 | 3/2002 | Letourneau |
| 5,463,532 A | 10/1995 | Petitpierre et al. | | 6,364,540 B2 | 4/2002 | Shishikura et al. |
| 5,469,526 A | 11/1995 | Rawlings | | 6,364,709 B1 | 4/2002 | Jones |
| 5,470,238 A | 11/1995 | Walden | | 6,369,924 B1 | 4/2002 | Scharf et al. |
| 5,481,634 A | 1/1996 | Anderson et al. | | 6,371,787 B1 | 4/2002 | Branch et al. |
| 5,487,678 A | 1/1996 | Tsuji et al. | | 6,406,317 B1 | 6/2002 | Li et al. |
| 5,491,613 A | 2/1996 | Petitpierre | | 6,416,361 B1 | 7/2002 | Hwang |
| 5,515,468 A | 5/1996 | DeAndrea et al. | | 6,422,763 B1 | 7/2002 | Halbach et al. |
| 5,528,408 A | 6/1996 | McGinley et al. | | 6,430,053 B1 | 8/2002 | Peterson et al. |
| 5,546,281 A | 8/1996 | Poplawski et al. | | 6,431,901 B1 | 8/2002 | Yeh |
| 5,548,677 A | 8/1996 | Kakii et al. | | 6,434,015 B1 | 8/2002 | Hwang |
| 5,561,727 A | 10/1996 | Akita et al. | | 6,439,918 B1 | 8/2002 | Togami et al. |
| 5,583,745 A | 12/1996 | Uwabo et al. | | 6,485,322 B1 | 11/2002 | Branch et al. |
| 5,596,663 A | 1/1997 | Ishibashi et al. | | 6,494,623 B1 | 12/2002 | Ahrens et al. |
| 5,600,470 A | 2/1997 | Walsh | | 6,517,382 B2 | 2/2003 | Flickinger et al. |
| 5,604,831 A | 2/1997 | Dittman et al. | | 6,519,160 B1 | 2/2003 | Branch et al. |
| 5,654,873 A | 8/1997 | Smithson et al. | | 6,524,134 B2 | 2/2003 | Flickinger et al. |
| 5,659,459 A | 8/1997 | Wakabayashi et al. | | 6,530,785 B1 | 3/2003 | Hwang |
| D389,802 S | 1/1998 | Vernon | | 6,533,470 B2 | 3/2003 | Ahrens |
| 5,717,533 A | 2/1998 | Poplawski et al. | | 6,533,603 B1 | 3/2003 | Togami |
| 5,734,558 A | 3/1998 | Poplawski et al. | | 6,556,445 B2 | 4/2003 | Medina |
| 5,738,538 A | 4/1998 | Brunch et al. | | 2002/0093796 A1 | 7/2002 | Medina |
| 5,757,998 A | 5/1998 | Thatcher et al. | | 2002/0167793 A1 | 11/2002 | Branch et al. |
| 5,766,027 A | 6/1998 | Fogg | | 2003/0007738 A1 | 1/2003 | Cairns et al. |
| 5,767,999 A | 6/1998 | Kayner | | | | |
| 5,797,771 A | 8/1998 | Garside | | | | |
| 5,820,398 A | 10/1998 | Stabroth et al. | | * cited by examiner | | |

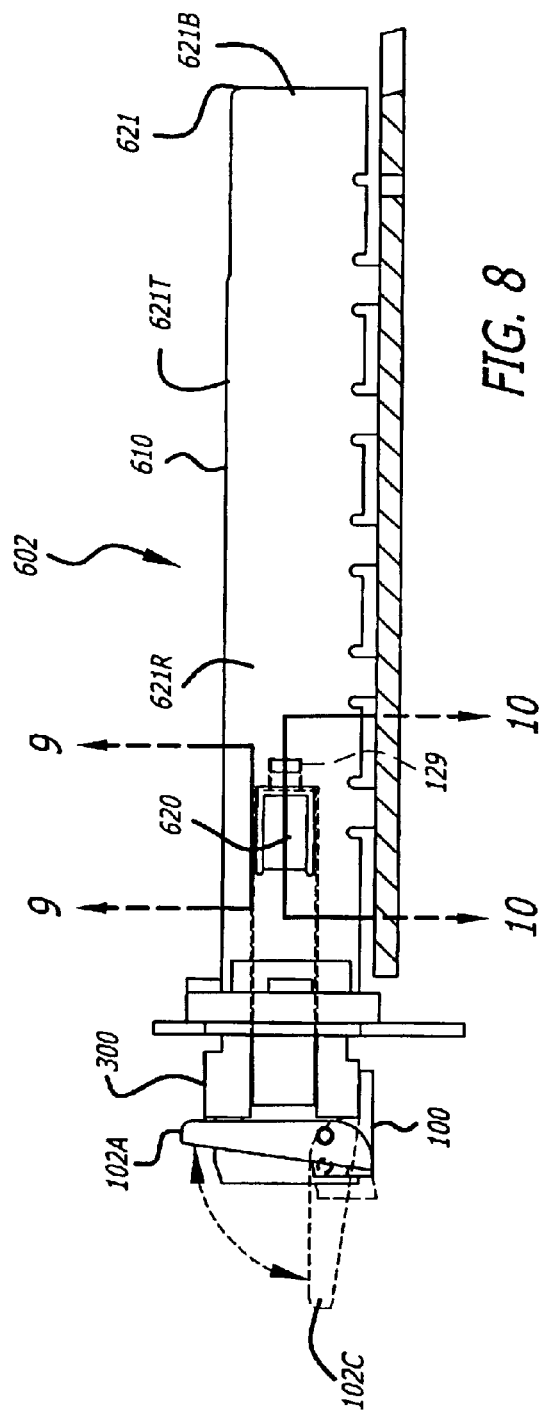
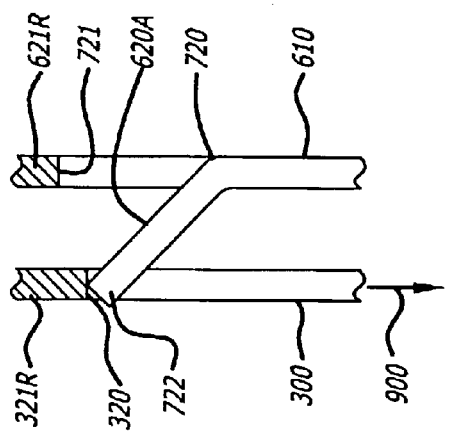
FIG. 8
FIG. 9

CAM-FOLLOWER RELEASE MECHANISM FOR FIBER OPTIC MODULES WITH SIDE DELATCHING MECHANISMS

CROSS REFERENCE TO RELATED APPLICATIONS

This United States (U.S.) patent application claims the benefit of and is a continuation-in-part of U.S. application Ser. No. 09/939,403 filed on Aug. 23, 2001 now U.S. Pat. No. 6,692,159 by inventors Liew Chuang Chiu et al., entitled "DE-LATCHING MECHANISMS FOR FIBER OPTIC MODULES" incorporated herein by reference, which claims the benefit of U.S. Provisional Application No. 60/313,232 filed on Aug. 16, 2001 by inventors Liew Chuang Chiu et al., entitled "DE-LATCHING MECHANISMS FOR FIBER OPTIC MODULES"; and also claims the benefit of and is a continuation in part (CIP) of U.S. patent application Ser. No. 09/896,695, filed on Jun. 28, 2001 by inventors Liew Chuang Chiu et al., entitled "METHOD AND APPARATUS FOR PUSH BUTTON RELEASE FIBER OPTIC MODULES", incorporated herein by reference, which claims the benefit of U.S. Provisional Application No. 60/283,843 filed on Apr. 14, 2001 by inventors Liew Chuang Chiu et al. entitled "METHOD AND APPARATUS FOR PUSH BUTTON RELEASE FIBER OPTIC MODULES", all of which are to be assigned to E2O Communications, Inc.

This United States (U.S.) patent application is also related to U.S. patent application Ser. No. 09/939,413, filed on Aug. 23, 2001 by Liew C. Chiu et al., entitled "PULL-ACTION DE-LATCHING MECHANISMS FOR FIBER OPTIC MODULES"; and U.S. patent application Ser. No. 09/656,779, filed on Sep. 7, 2000 by Cheng Ping Wei et al. both assigned to E2O Communications, Inc.

FIELD

This invention relates generally to fiber optic modules. More particularly, the invention relates to retention and release mechanisms for unplugging fiber optic modules.

BACKGROUND

Fiber optic modules can transduce electrical data signals in order to transmit optical signals over optical fibers. Fiber optic modules can also transduce optical signals received over optical fibers into electrical data signals.

The size or form factor of fiber optic modules is important. The smaller the form factor of a fiber optic module, the less space taken on a printed circuit board to which it couples. A smaller form factor allows a greater number of fiber optic modules to be coupled onto a printed circuit board to support additional communication channels. However, the smaller form factor makes it more difficult for a user to handle.

When a fiber optic module embedded in a system fails it is desirable to replace it, particularly when other communication channels are supported by other operating fiber optic modules. To replace a failed fiber optic module it needs to be pluggable into a module receptacle. While plugging in a new fiber optic module is usually easy, it is more difficult to remove the failed fiber optic module because of other components surrounding it. Additionally, a user should not attempt to pull on fiber optic cables in order to try and remove a failed fiber optic module or else the user might cause damage thereto.

A typical release method for a pluggable fiber optic module is to push in on the fiber optic module itself and then pull out on the fiber optic module to release it from a cage assembly or module receptacle. It has been determined that this method is not very reliable with users complaining of the difficulty in removing pluggable fiber optic modules in this manner.

Users often complain that traditional methods offer little leverage in getting a sufficient grip on the module when attempting to pull it out of a module receptacle. Another complaint is that traditional actuators used to remove fiber optic modules are inaccessible or invisible. Other users complain that once released by the traditional method, it is difficult to withdraw the fiber optic module out of its cage or module receptacle.

Additionally, the pushing and then pulling of traditional methods places extra strain on components of the fiber optic module itself, the cage assembly or module receptacle and any electrical connections which the fiber optic module makes with an electrical connector. Oftentimes more than one cycle of pushing and pulling on the fiber optic module is required to release it from the cage or receptacle.

It is desirable to make it easier to remove pluggable fiber optic modules.

BRIEF SUMMARY OF THE INVENTION

Briefly, the invention is described in the claims.

In one embodiment, a release mechanism for fiber optic modules includes a release fork having a pair of sliding actuators and a base coupled there-between, the pair of sliding actuators including a pillar at one end coupled to the base and a delatching mechanism at another end, the delatching mechanism to push out on a tab of a cage to delatch a fiber optic module therefrom; a pin coupled to the pillar, the pin having a shank extending out from the pillar; and a rotatable lever arm having an end with an elliptical cam lobe and a circular opening to accept the pin, the lever arm to rotate about the pin such that the cam lobe pushes against a bearing surface to cause the pair of sliding actuators to slide and the delatching mechanism to push out on the tab of the cage to delatch the fiber optic module therefrom. The delatching actuator may include a ramp and a crown to push out on the tab of the cage to delatch the fiber optic module therefrom. The release mechanism may further include a leaf spring coupled to the base, the leaf spring to push back against the rotatable lever arm and return it to a home position. In one embodiment, the rotatable lever arm is a rotatable bail lever having a pair of struts and a handle bar coupled there-between.

In another embodiment, a fiber optic module with a release mechanism includes a housing having a pair of pins in a bottom side, the housing further having one or more optical plug receptacles in a front side, an opening in a back side, and a pair of side openings forming a catch in each side, the catch in each side to receive a side tab in each side of a cage to retain the fiber optic module therein, the one or more optical plug receptacles to receive one or more fiber optic cable plugs; a printed circuit board mounted in the housing, the printed circuit board at one end including one or more electro-optic transducers to convert optical signals into electrical signals or electrical signals into optical signals, the printed circuit board at another end including an edge connection aligned with the opening in the back side of the housing to couple to a connector of a host, the printed circuit board further including one or more integrated circuits electrically coupled between the edge connection and the one or more electro-optic transducers; and a cam follower release mechanism movably coupled to the housing to release the fiber optic module from the cage using a rotational action. The cam follower release mechanism may include a rotatable lever including a cam portion at one end and an opening about which the cam portion may rotate; a fork including a base and a pair of pillars with a pair of side sliding actuators coupled respectively thereto, each of the pair of side sliding actuators including a delatching actuator, the base further including a bearing surface to support the cam portion of the rotatable lever, the pair of side sliding actuators to slide along the respective pair of side openings in the housing in response to rotation action of the rotatable lever and the delatching actuators to push out on the side tabs of the cage to release the fiber optic module there-from; and a pin coupled to one of the pair of pillars, the opening in the rotatable lever rotatably coupled over the pin, the pin to allow the rotatable lever to rotate between a first position and a second position to release the fiber optic module from the cage. The base of the release mechansim may further include a stop to limit the angle of rotation of the rotatable lever. The rotatable lever may include a pair of rotatable levers coupled together by a handlebar at a first end, each of the pair of rotatable levers includes the cam portion at a second end opposite the first end and the opening about which the cam portion may rotate. The cam release mechanism may further include a leaf spring coupled between the base and the housing to moveably couple the cam release mechanism to the housing and to return the rotatable lever to the first position.

In yet another embodiment, the fiber optic module with the release mechanism includes a printed circuit board, a housing around the printed circuit board, and the release mechanism moveably coupled to the front side of the housing between a latch position and a release position. The printed circuit board has one or more opto-electronic devices at one end, an edge connection at an opposite end, and one or more integrated circuits electrically coupled between the edge connection and the one or more opto-electronic devices. The housing has a top side, a bottom side, a right side and a left side, with one or more optical plug receptacles in the front side to receive one or more optical plugs of a fiber optic cable in alignment with the one or more opto-electronic devices, and a pair of openings forming catches in the right side and the left side. The catches in the right side and the left side of the housing can engage tabs in a right side and a left side of a cage to retain the fiber optic module therein. The release mechanism moves from the latch position to the release position using a rotational action to release the fiber optic module from the cage. The release mechanism includes a rotational cam mechanism and a follower mechanism moveably coupled to the rotational cam mechanism. The rotational cam mechanism receives the rotational action. The rotational cam mechanism includes a rotatable cam portion and a rotatable lever portion. The rotatable cam portion of the rotational cam mechanism is moveably coupled to the front side of the housing. The follower mechanism moveably couples to the rotational cam mechanism to translate its rotational action into a linear action. The follower mechanism includes a pair of delatch actuators each having a ramp. The ramps in the pair of pair of delatch actuators release the tabs of the right side and the left side of the cage from the catches in the right side and left side of the housing by pushing out away from the sides of the fiber optic module and release it from the cage. This is in response to the linear action of the follower mechanism translated from the rotational action of the rotational cam mechanism. The release mechanism further includes a spring mechanism coupled between the release mechanism and the housing, the spring mechanism to generate tension between the housing and the release mechanism to return the release mechanism to the latch position such that the tabs of the cage can engage the catches of the fiber optic module. The rotatable cam portion may be an elliptical cam lobe and the spring mechanism may be a leaf type spring. The follower mechanism may be a fork including a pair of side slide actuators respectively with the pair of delatch actuators.

With the release mechanism, the fiber optic module from may be released from the cage by rotating the bail release lever of the fiber optic module from a first position to a second position to generate a rotational motion in a cam lobe about a pivot point; translating the rotational motion of the cam lobe into a linear pulling motion of a sliding side release mechanism of the fiber optic module; and pushing out on a side tab of the cage to release the side tab from a side catch of the fiber optic module. The sliding side release mechanism includes a delatching actuator with a ramp to push out on the side tab of the cage. After being released from the cage, the fiber optic module may be withdrawn by pulling out on the fiber optic module away from the cage such that the side tab of the cage slides over the side catch of the fiber optic module. In an alternate method, the sliding side release mechanism is a pair of sliding side release mechanisms, the fiber optic module includes a pair of side catches, and the pushing out on the side tab includes pushing out on a pair of side tabs to release them from the pair of side catches of the fiber optic module. The sliding side release mechanism is a linear follower of the cam lobe. After the module is released and/or withdrawn by pushing out on the side tab of the cage to release the side tab from the side catch of the fiber optic module, the bail release lever of the fiber optic module may be returned to the first position from the second position.

In yet another embodiment, the fiber optic module with the release mechanism is part of a system that further includes a host adapter. In the system, the host adapter has a host printed circuit board; an edge connector coupled to the host printed circuit board, a hollow cage coupled to the host printed circuit board over the edge connector near a rear end, the hollow cage including an opening at a front end into an interior portion and a pair of flexible tabs in respective left and right side walls, the pair of flexible tabs bent into the interior portion of the hollow cage to latch with catches in respective left and right sides of a fiber optic module. In the system, the fiber optic module can couple to the host adapter. The fiber optic module includes a housing with the catches in respective left and right sides thereof, the housing further including openings in respective left and right sides to accept a pair of slide actuators with delatch actuators at one end, the housing further including a fiber optic plug receptacle in a front side, the housing further including a pair of posts in a bottom side to couple to a leaf spring; a printed circuit board mounted in the housing, the printed circuit board including one or more opto-electronic devices to transduce between electrical and optical signals, and an edge connection to couple electrical signals between the host printed circuit board and the one or more opto-electronic devices; and a cam-follower release mechanism moveably coupled to the housing to release the tabs of the cage from the catches of the housing. The cam-follower release mechanism includes a moveable base moveably coupled around the housing, a pair of pins having one end coupled to the moveable base, a rotatable bail lever having a pair of lever arms with openings rotatably coupled over the pair of pins, and a leaf spring coupled between the moveable base and the housing. The moveable base includes a spring retention post, a pair of bearing surfaces, the pair of slide actuators with delatch actuators at the end. The pair of slide actuators slideably couple into the openings in the left and right sides of the housing. Each of the pair of pins have a pivot rod extending from the moveable base. Each of pair of lever arms of the rotatable bail lever include a cam lobe at one end. The cam lobe of each pair of lever arms is moveably coupled to the respective pair of bearing surfaces of the moveable base. The pair of lever arms of the rotatable bail lever may be coupled together at another end by a handle bar. The rotatable bail lever rotates around the pair of pins from a latch position where the tabs of the cage engages the catches of the fiber optic module to a release position where the tabs of the cage are disengaged from the catches of the fiber optic module. The leaf spring is coupled between a spring retention post of the moveable base and posts in the bottom side of the housing. The leaf spring to retain the moveable base moveably coupled around the housing and return the rotatable bail lever to the latch position from the release position. In the system, the cam lobe of each pair of lever arms may be an elliptical cam lobe.

BRIEF DESCRIPTIONS OF THE DRAWINGS

FIG. 1A is a cross-sectional top view of a portion of the rotating bail lever delatching mechanism of FIG. 1 for side latches of a fiber optic module.

FIG. 2B is a right side view of the elements of the rotating bail lever delatching mechanism for side latches of a fiber optic module in an open or released position.

FIG. 8 is a side view of the fiber optic module including the rotating bail lever delatching mechanism inserted into the cage or receptacle of a host adapter of a host system.

FIG. 9 is a magnified cross sectional view of a portion of FIG. 8 illustrating the right side of the fiber optic module and the right side of the cage or receptacle.

DETAILED DESCRIPTION

In the following detailed description of the invention, numerous specific details are set forth in order to provide a thorough understanding of the invention. However, one skilled in the art would recognize that the invention may be practiced without these specific details. In other instances well known methods, procedures, components, and circuits have not been described in detail so as not to unnecessarily obscure aspects of the invention.

In the following description, certain terminology is used to describe various features of the invention. For example, a "fiber-optic transceiver" is a fiber optic module having optical signal transmit and receive capability. The terms "disengage", "release", "unlatch", and "de-latch" may be used interchangeably when referring to the de-coupling of a fiber optic module from a cage assembly.

The invention includes methods, apparatuses and systems for fiber optic modules including releasable fiber optic modules in a form factor to satisfy a 10 Gigabit Small Form Factor Pluggable Module more commonly referred to as an XFP type package.

In U.S. application Ser. No. 09/939,403 filed on Aug. 23, 2001 by inventors Liew Chuang Chiu et al., entitled "DE-LATCHING MECHANISMS FOR FIBER OPTIC MODULES" which is incorporated herein by reference, a rotating bail lever is introduced to release a boss on the bottom of the fiber optic module from an opening or catch in a cage or receptacle. The rotating bail lever causes a sliding actuator to use one or more ramps at one end to lever a latch of the cage or receptacle on the bottom side thereof. This application extends the operating principal of a rotating bail lever and sliding actuator from activating a release mechanism on the bottom side of the fiber optic module to activating one or a pair of release mechanisms on one or both of the left and right sides of the fiber optic module.

One or a pair of catches in the left and right sides of the fiber optic module engages a respective one or pair of inside tabs in the left and right sides of a cage or receptacle when the fiber optic module is fully inserted therein. The release mechanism of the invention includes a sliding actuator with a ramp at a first end and a second end that is pulled outward by a cam of a rotatable bail lever that is moved from an engaged position to a release position. As the sliding actuator slides, the tabs of the cage or receptacle slide up the ramps of each delatching fork pushing the tabs outward away from the fiber optic module. As the tabs reach near the top of the ramps, they are disengaged from the catches of the fiber optic module. The fiber optic module can then be gripped and pulled out in a number of ways including by pulling on the rotatable bail lever.

Figure 1:
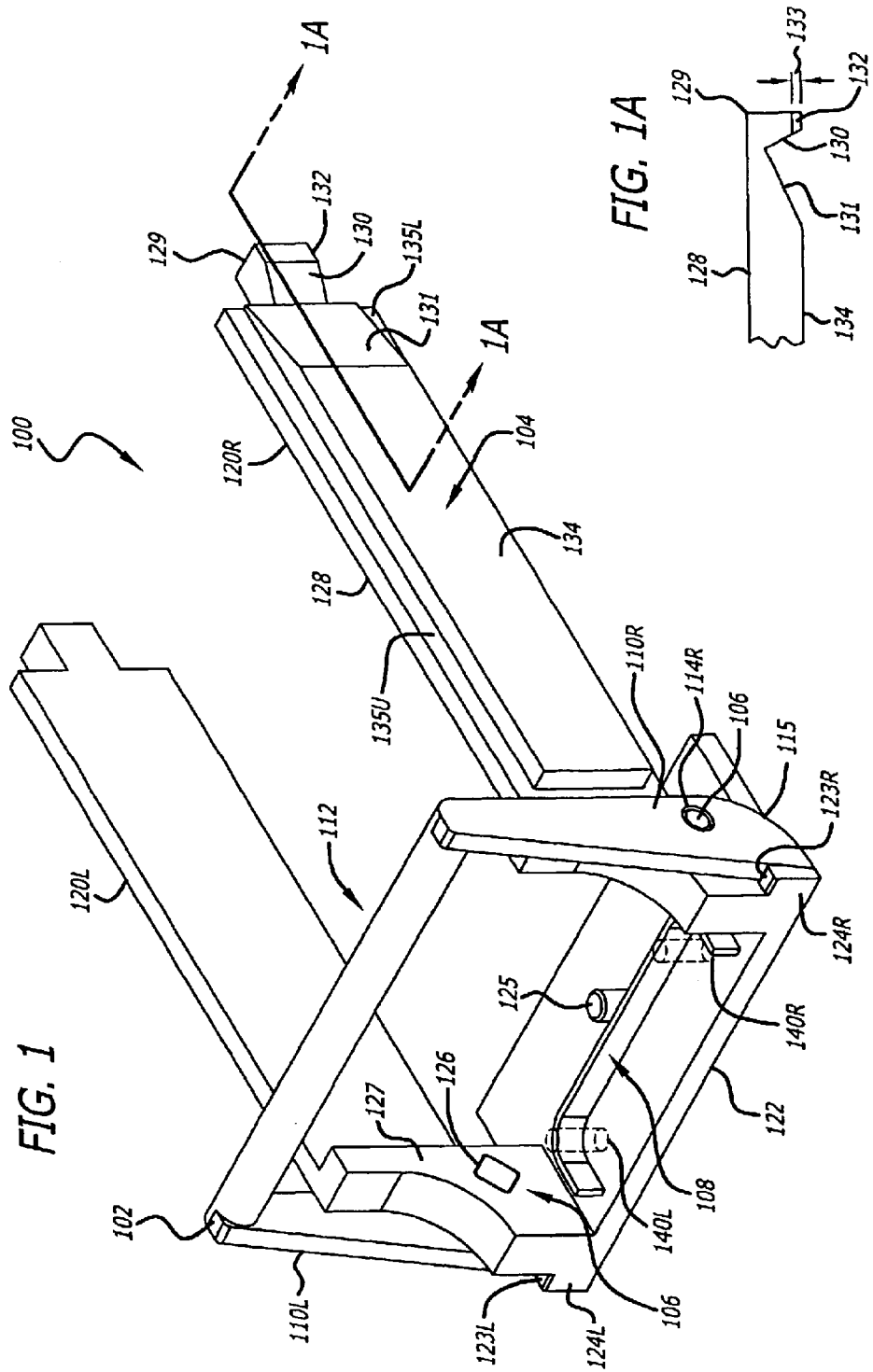
FIG. 1 is a perspective view from the right side of the elements of a rotating bail lever delatching mechanism for side latches of a fiber optic module in a closed or latch position.

Referring now to FIG. 1, the release or delatch mechanism 100 of the invention is illustrated disassembled from the fiber optic module. The release mechanism 100 includes a cam-follower mechanism to actuate a sliding actuator.

The release mechanism 100 includes a rotatable bail lever 102, a delatching fork 104, a pair of pins 106, and a leaf type spring 108 coupled together as shown in FIG. 1. The delatching fork 104 is a sliding actuator. The rotatable bail lever 102 pivots about the pair of pins 106. The leaf type spring 108 may push against a spring retaining post 125 in a base 122 of the delatching fork 104 and posts 140L–140R of the fiber optic module.

The rotatable bail lever 102 includes a pair of side struts or lever arms 110L–110R, a handle bar 112 coupled between the lever arms 110L–100R at a first end, and a pair of pivot pin openings 114L–114R on each side. Each of the side struts or lever arms 110L–110R includes an off-center cam profile 115 as an integral part thereof at a second end. The off-center cam profile 115 of the lever arms 110 includes a cam lobe 116 which pushes against a bearing surface as is discussed further below. The off-center cam profile 115 of the lever arms 110 is the cam element of the cam-follower mechanism. The handle bar 112 acts as a grip handle of the bail lever 102 and is the point where external force is applied by a user in order to release a fiber optic module from a cage or receptacle.

The delatching fork 104 is a forked part with a trunk or base and a pair of branches or tines. The delatching fork 104 includes a left side sliding actuator 120L, a right side sliding actuator 120R, and a base 122 coupled between the left and right side sliding actuators 120L–120R at a first end. The base 122 includes a left side stop 124L, a right side stop 124R, and a spring retaining post 125. The left side stop 124L and the right side stop 124R respectively include left and right stop pads 123L–123R to stop further rotation of the bail lever 102.

Each of the left and right side sliding actuators 120L–120R includes a pillar 127 coupled to the base 122, an extended arm 128 coupled to the pillar at one end, and a delatch actuator 129 coupled to the extended arm 128 at a second end thereof. Each pillar 127 includes a pin opening 126 to receive the pin 106.

The extended arm 128 includes a raised platform 134 forming an upper slide rail 135U and a lower slide rail 135L with a sloped resting surface or ramp 131 near the delatch actuator 129. The sloped resting surface 131 receives a tab or catch of a cage or receptacle, when the fiber optic module is inserted therein, so that the tab can engage the housing of the fiber optic module. The upper and lower slide rails 135U–135L slide along an inside side surface of the housing of the fiber optic module as the release mechanism is engaged.

The delatch actuator 129 includes a ramp or wedge 130 and a crown 132. When the rotatable bail lever is rotated from a home, engaged, latched or closed position, the ramp 130 increasingly pushes out on the tab and the crown 132 continues pushing out on the tab of the cage or receptacle to release the fiber optic module, as is explained in greater detail below. The delatch actuator 129, including its ramp 130 and crown 132, are followers of the cam follower mechanism as part of the fork 104.

Referring momentarily now to FIG. 1A, a cross-sectional top view of the delatch actuator 129 coupled to the end of the extended arm 128 is illustrated. As discussed previously, the extended arm 128 includes the raised platform 134 with a sloped resting surface 131 near the delatch actuator 129. The delatch actuator 129 includes the ramp or wedge 130 and the crown 132. A difference 133 in thickness, between the thickness of the sliding actuator 120 at the crown 132 and the maximum thickness of the platform 134, pushes out on the tab sufficiently enough to disengage latching mechanism of the cage or receptacle from the fiber optic module. The crown 132 may extend slightly out from the side of the housing of the fiber optic module and flex the tab of the cage or receptacle as the fiber optic module is fully inserted therein.

Referring back to FIG. 1, the leaf type spring 108 is U-shaped or C-shaped in one embodiment with each end between the pillars 127 of the left and right side sliding actuators 120L–120R as illustrated in FIG. 1. The hooked ends of the leaf type spring 108 may be placed around a left post 140L of the fiber optic module housing (near the nose receptacle) at one hooked end and a right post 140R of the fiber optic module housing (near the nose receptacle) at the other hooked end. A back side of a mid-section of the leaf spring 108 may couple to the spring retaining post 125 of the base 122. As the release mechanism is moved to the open or release position, the leaf spring 108, retained by the post 125, pushes back on the posts 140L and 140R as the base 122 moves. In this manner, the leaf spring 108 acts as a spring mechanism to ensure that the cam-follower mechanism returns back to its home, closed, or latched position. The leaf spring 108 also keeps the release mechanism 100 moveably coupled to a housing of a fiber optic module. The posts 140L and 140R may be another type of retention member coupled to the bottom of the housing.

Each of the pair of pins 106 may include a square or rectangular head at one end and a shank or pivoting rod extending there-from. Each of the pins is coupled to the pillars 127 through the holes 126. The struts or lever arms 110L–110R of the bail lever 102 are rotatably coupled to the shank of the pair of pins 106 through the openings 114L–114R in the struts or arms 110L–110R. The square or rectangular head design prevents rotation of the pin during rotation of the bail lever and the struts to avoid wear and tear. In another embodiment, the head is a shank head design or a circular head design that may or may not allow rotation of the pin. The cam of the bail lever rotates around an axis defined by the shank or pivot rod of the pin 106. The pair of pins 106 may be press fitted into the holes or openings 126 or a glue, cement, or epoxy may be used to secure the pins in the holes or openings 126 to the pillars 127. The bail lever 102 may be rotatably coupled to the release mechanism by other means including a single through pin secured to the pillars 127, for example.

Figure 2:
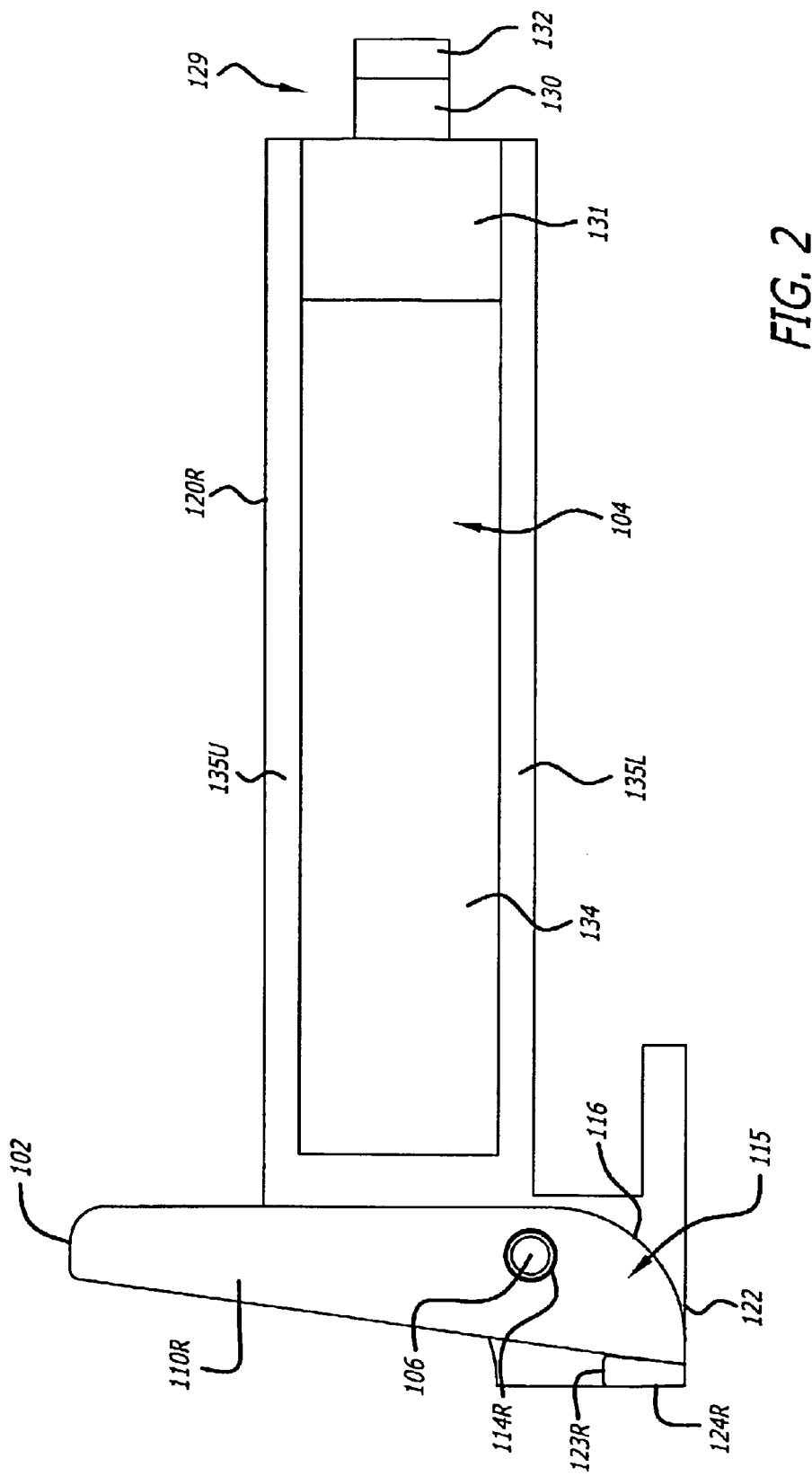
FIG. 2 is a right side view of the elements of the rotating bail lever delatching mechanism for side latches of a fiber optic module in a closed or latched position.

Referring now to FIG. 2, a right side view of the release mechanism 100 is illustrated disassembled from the fiber optic module. The off-center cam profile 115 of the lever arm 110R is more visible from the right side view of FIG. 2. The off-center cam profile 115 of the lever arm 110L is a mirror image of the off-center cam profile 115 of the lever arm 110R.

The lever arms 110 include a cam lobe 116 as an integral part thereof to form the off-center cam profile 115. The right side view of FIG. 2 better illustrates the upper slide rail 135U and the lower slide rail 135L formed by the raised platform 134 of the extended arm 128 of the fork 104. As discussed further below, the upper slide rail 135U and the lower slide rail 135L slide along respective slots or guides in the sides of the housing of the fiber optic module.

Figure 3:
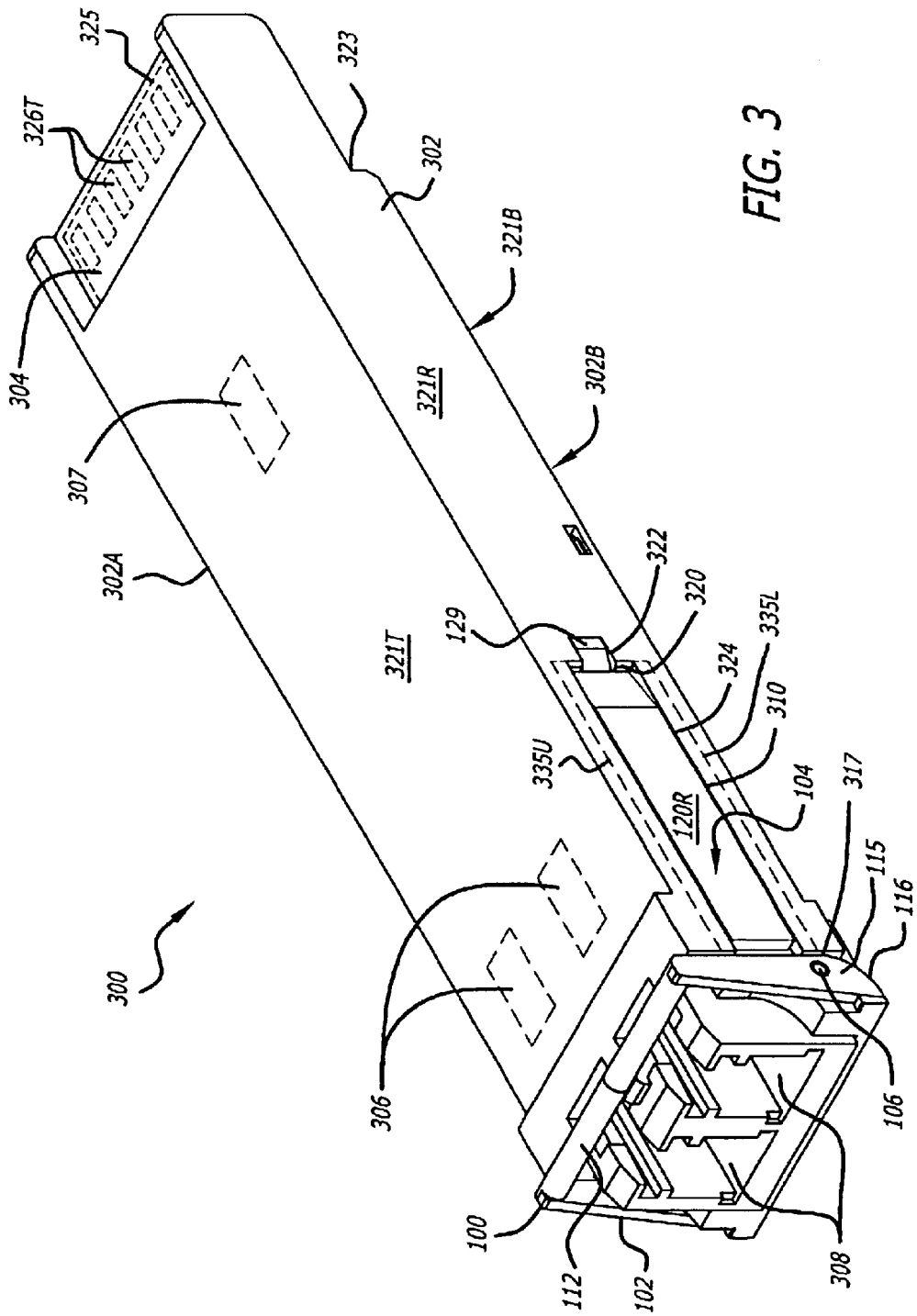
FIG. 3 is a top perspective view of an embodiment of an assembled fiber optic module including the rotating bail lever delatching mechanism for side latches.

Referring now to FIG. 3, the release or delatch mechanism 100 of the invention is illustrated in a perspective view assembled as part of a fiber optic module 300. That is, the fiber optic module 300 includes the release or delatch mechanism 100 of the invention. The fiber optic module 300 further includes a housing 302, a printed circuit board 304 mounted within the housing 302, one or more optoelectronic devices 306 (TOSA and/or ROSA) mounted to the printed circuit board 304 within the housing 302, one or more integrated circuits (ICs) 307 mounted to the printed circuit board 304 within the housing 302, and one or more optical plug receptacles or openings 308 in the housing 302 at a front end of the module 300.

The housing 302 may include a top half 302A and a bottom half 302B that couples to the top half 302A. The housing 302 includes a top side 321T, a bottom side 321B, a right side or right wall 321R, and a left side or left wall 321L. The housing 302 may further include a bottom opening 323 at a rear end thereof to allow access to an edge connection 325 of the printed circuit board 304.

The housing 302 further includes an opening 310 in each side 321L–321R to accommodate the sliding actuators 120L–120R. The opening 310 further forms the catch 320 in each side 321L–321R of the housing 302 that interfaces with a tab of the cage or receptacle as is further described below. Each opening 310 includes an opening 322 to accommodate the delatch actuator 129 and an opening 324 to accommodate the platform 134 of the sliding actuators 120L–120R. To distinguish each, the opening 310 may be referred to as the slide opening 310, the opening 324 may be referred to as the platform opening 324, and the opening 322 may be referred to as the delatch opening 322.

The housing 302 further includes an upper groove 335U and a lower groove 335L in each side to allow the upper and lower slide rails 135U–135L of the fork 104 to slide along. The grooves may alternatively be a pair of rails or a number of guide tabs along which the upper and lower slide rails 135U–135L slide along.

The grooves and openings 310 in the housing are positioned (i.e. are sufficiently deep enough) so that the level of the surface of the platform 134 is substantially equal to the level of the surface of each side 321L–321R so that the fiber optic module 300 can easily slide within a cage or receptacle. The difference 133 in thickness at the crown 132 is approximately the distance the delatch actuator 129 extends beyond each side 321L–321R of the housing 302. The crown 132, extending slightly from the side of the housing 302, flexes a tab of the cage or receptacle as the fiber optic module is fully inserted therein. The ramps or wedges 130 of the delatch actuators 129 have their slope facing towards the one or more optical receptacles 308.

The printed circuit board 304 includes one or more top contact pads 326T and one or more bottom contact pads 326B at a rear end of the printed circuit board to form the edge connection 325. The edge connection 325 allows the fiber optic module 300 to electrically interface to a host printed circuit board through an edge connector mounted thereto.

The one or more optoelectronic devices 306 (TOSA and/or ROSA) mounted to the printed circuit board 304 within the housing 302 are either optical receivers and/or optical transmitters that transduce between optical signals and electrical signals. The one or more optoelectronic devices 306 couple light into and/or out of optical fibers to communicate data by means of light or optical signaling. That is data may be modulated into the light signals and demodulated from the light signals.

The one or more integrated circuits (ICs) 307 are electrically coupled between the edge connection 325 and the one or more optoelectronic devices 306. The one or more integrated circuits (ICs) 307 controls the flow of data between the edge connection 325 and the one or more optoelectronic devices 306. The one or more integrated circuits (ICs) 307 provide the electrical interface to the host adapter and the host system and the electrical interface to the one or more optoelectronic devices 306.

The one or more optical plug receptacles or openings 308 interface to the plugs of the optical fiber cable or patch cord as will be further described below. The one or more optical plug receptacles or openings 308 align the plugs and ends of the optical fiber with the one or more optoelectronic devices 306 so that light can be efficiently coupled there-between. In one embodiment, the one or more optical plug receptacles or openings 308 are LC-type optical plug receptacles or openings. In other embodiments, the one or more optical plug receptacles or openings 308 may be of a different size such as an SC-type optical plug receptacles or openings or a single plug receptacle with two cables, such as an MTRJ-type optical plug receptacle or opening.

Figure 4:
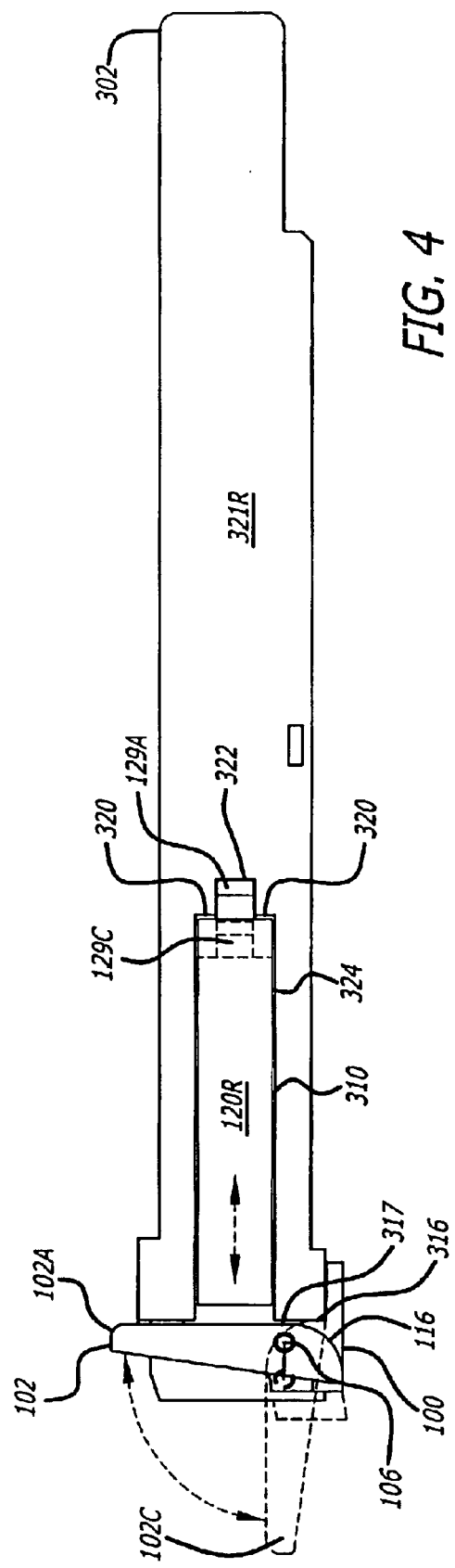
FIG. 4 is a side view of the embodiment of the assembled fiber optic module including the rotating bail lever delatching mechanism for side latches.

Referring now to FIG. 4, a side view of the fiber optic module 300 including the release or delatch mechanism 100 of the invention is illustrated. FIG. 4 illustrates how the release or delatch mechanism 100 moves with respect to the fiber optic module 300 as the rotatable bail lever 102 is moved from a first position 102A to a second position 102C. The fork 104 and The sliding actuators 120L–120R including the delatch actuators 129 of the fork 104 move back and forth within the openings 310 of the housing as the rotatable bail lever 102 is rotated from a first position 102A to a second position 102C. The delatch actuator 129 is in a first position 129A when the rotatable bail lever 102 is in its first position 102A. The delatch actuator 129 is in a second position 129C when the rotatable bail lever 102 is in its second position 102C. The first positions 102A and 129A may alternatively be referred to as a home, a latched, an engaged, or a closed position. The second positions 102C and 129C may alternatively be referred to as a stop, a released, a disengaged, or an open position.

As the rotatable bail lever 102 is rotated back and forth from the first position 102A to the second position 102C, the cam lobe 116 makes contact at a pressure point 317 of a bearing surface 316. The pressure point 317 is the contact point along the bearing surface 316 where energy-transfer of the cam-follower mechanism takes place.

FIG. 4 also illustrates how the catch 320 formed by the opening 324 may be broken up into two sections or portions by the opening 322 at a middle portion thereof. Alternatively, the catch 320 may be contiguous with the opening 322 at a top or bottom portion of the opening 324.

Figure 5:
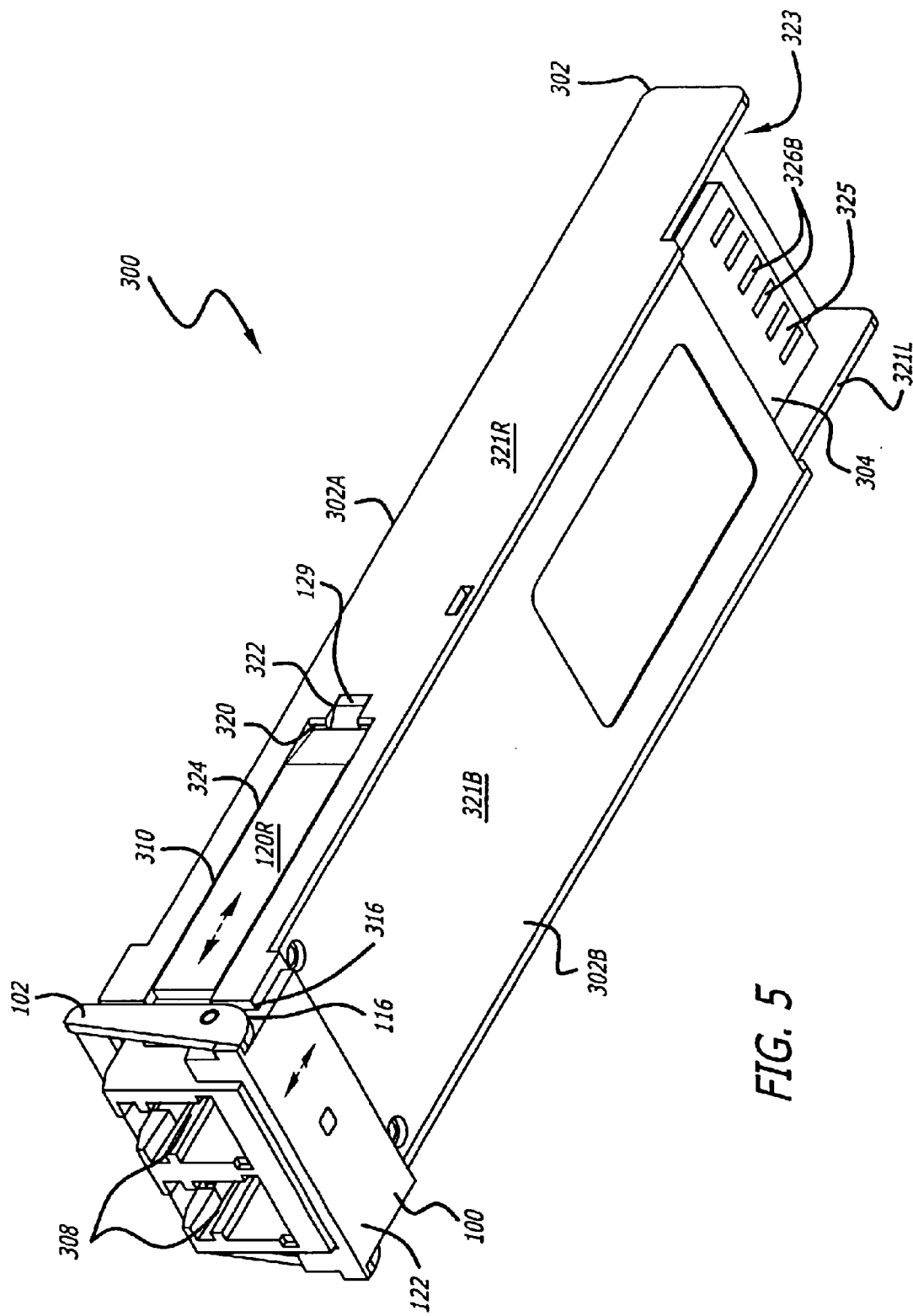
FIG. 5 is a bottom perspective view of the embodiment of the assembled fiber optic module including the rotating bail lever delatching mechanism for side latches.

Referring now to FIG. 5, a bottom perspective view of the fiber optic module 300 including the release or delatch mechanism 100 of the invention is illustrated. FIG. 5 further illustrates how the release or delatch mechanism 100 moves with respect to the fiber optic module 300 as the rotatable bail lever 102 is moved from the first position 102A to the second position 102C. Not only does the fork 104 move back and forth in response to the rotation of the rotatable bail lever 102, but the base 122 of the release mechanism 100 moves back and forth in response to the rotation of the rotatable bail lever 102. Linear movement of the base 122 out from the fiber optic module 300 generates further tension in the leaf spring 108 between the post 125 in the base 122 and the posts 140L and 140R of the housing 302.

FIG. 5 also illustrates the bottom opening 323 in the housing 302 to allow access to the edge connection 325 and the pads 326T and 326B that may be respectively on a top side and a bottom side of the printed circuit board 304.

Figure 6:
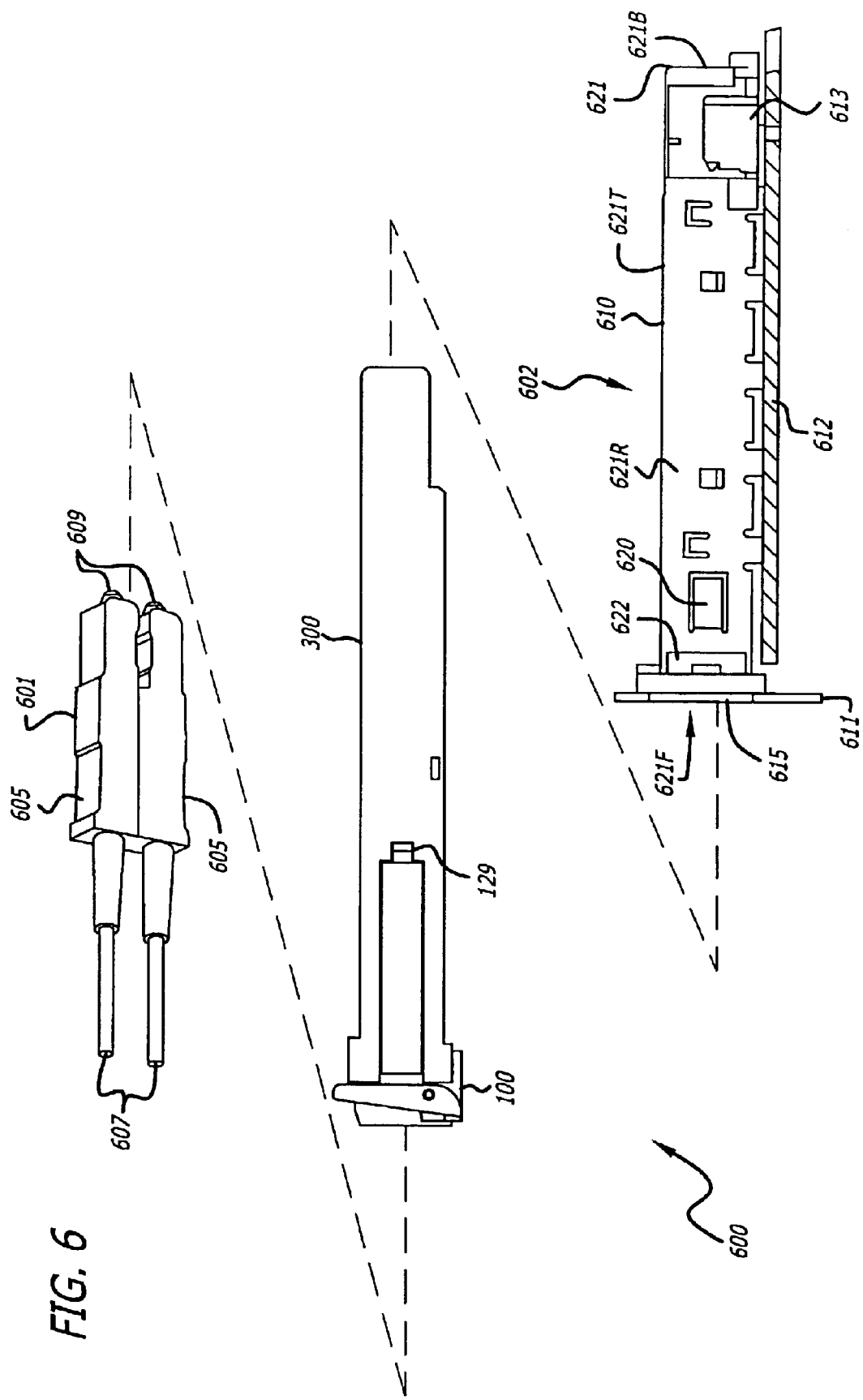
FIG. 6 is an exploded view of a host system including the assembled fiber optic module including the rotating bail lever delatching mechanism for side latches and a cage or receptacle.

Referring now to FIG. 6, a disassembled system 600 is illustrated. The system 600 includes a fiber optic cable 601, the fiber optic module 300, and a host adapter 602. The fiber optic cable 601 couples (i.e., plugs) in and out of the optical plug receptacle 308 of the fiber optic module 300. The fiber optic module 300 couples in and out of (i.e., slides or plugs in and out of) the cage or receptacle 610 of the host adapter 602.

The fiber optic module 300 includes the optoelectronic devices 306, such as one or more or both of a receiver and transmitter, and the release mechanism 100 described previously in greater detail.

The fiber optic cable 601 includes one or more plugs 605 and one or more optical fiber cables 607. At the end of the one or more plugs 605 is one or more optical fiber terminations 609 of the one or more optical fiber cables 607 to launch light into or receive light from the fiber optic module 300.

The host adapter 602 includes a cage or receptacle 610, a bezel or faceplate 611, a host printed circuit board (PCB) 612, and an edge connector 613 coupled to the host printed circuit board 612. The cage or receptacle 610 couples to the host printed circuit board 612 and over and around the edge connector 613. The bezel or faceplate 611 may mount against or couple to the cage or receptacle 610 and the host printed circuit board 612.

The cage or receptacle 610 includes a housing 621 that has a front side 621F with an opening 615, a back side 621B, a top side 621T, a left side 621L (not shown in FIG. 6), and a right side 621R. The bottom side of the housing 621 may be wholly open or partially open to couple to the host printed circuit board and cover over the edge connector 613. The cage or receptacle 610 may further include an EMI gasket 622 that may be integrally formed with the cage or receptacle.

The housing 621 of the cage or receptacle 610 includes a tab latch or catch 620 in one or both sides 621R and 621L. The tab latch or catch 620 in one or both sides 621R and 621L is a retention mechanism that interfaces with each side of the delatching fork 104 and housing of the fiber optic module 300. More specifically as will be discussed further below, the tab latch or catch 620 interfaces with the delatch actuator 129 and the ramps 130–131 and crown 132 thereof.

Figure 7A:
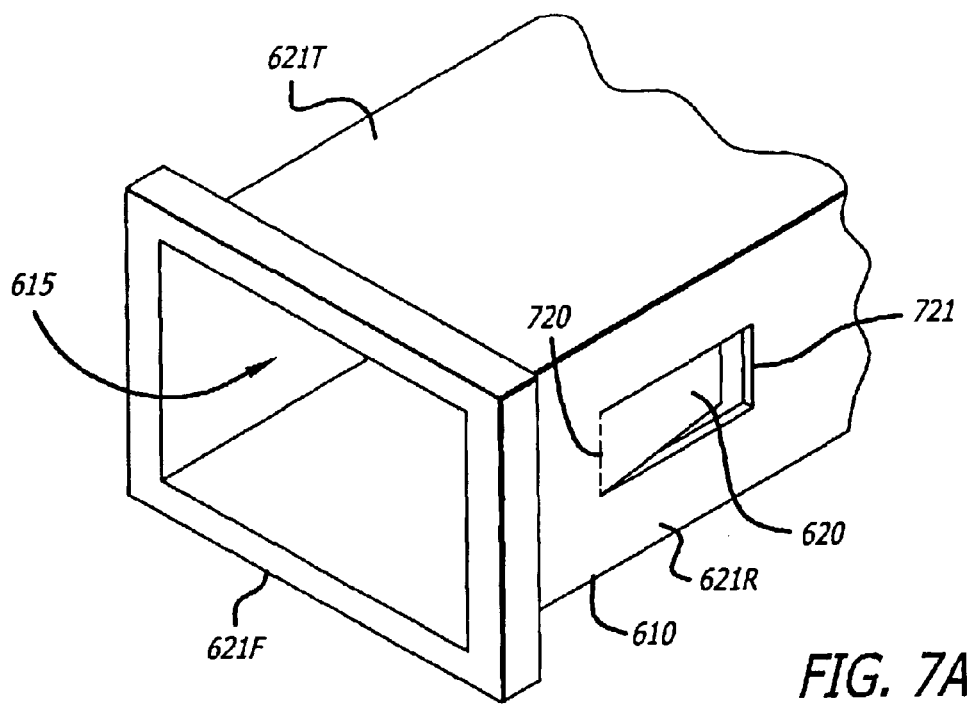
FIG. 7A is a perspective view of a portion of the cage or receptacle that receives the fiber optic module.

Referring now to FIG. 7A, a magnified perspective view of the cage or receptacle 610 is illustrated. FIG. 7A illustrates how the tab 620 bends inward into the interior of the cage or receptacle. The tab 620 is cutout around cut 721 from the right and left sides 621R–621L and pushed inward. The tab 620 is movable and flexes around a flex line 720.

Figure 7B:
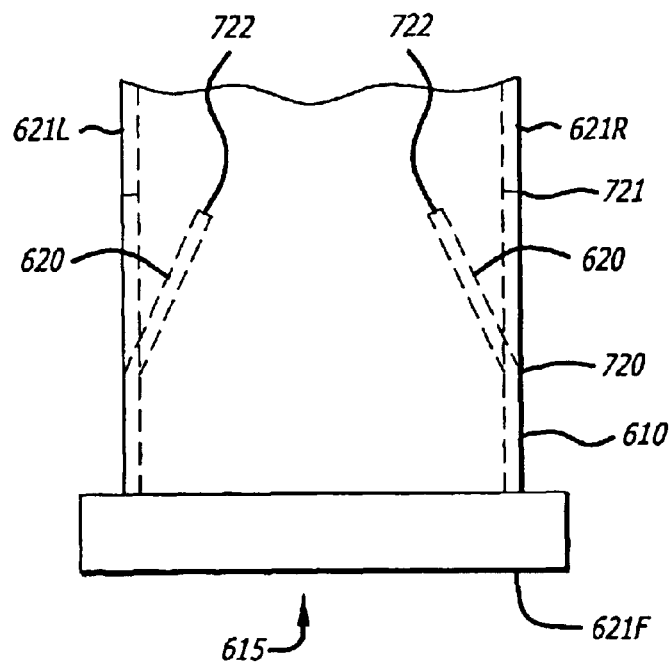
FIG. 7B is a cross sectional view of a portion of the cage or receptacle illustrating the left side and right side tabs extending into the interior of the cage or receptacle.

Referring now to FIG. 7B, a magnified cutaway view from the top of the cage or receptacle 610 is illustrate. FIG. 7B further illustrates how the tabs 620 bend inward into the interior of the cage or receptacle. Each of the one or more tabs 620 includes a tip 722. The tip 722 of each of the one or more tabs 620 can engage the one or more catches 320 in the right side 321R and/or the left side 321L of the housing 302 of the fiber optic module 300 to retain it therein.

Referring now to FIG. 8, the fiber optic module 300 is fully inserted into the cage or receptacle 610 of the host adapter 602. Each tab 620 of the cage 610 is engaged with each catch 320 of the fiber optic module 300. In this manner, the fiber optic module 300 is retained in the cage or receptacle 610 and can not be removed without releasing each tab 620 from being engaged with each respective catch 320 of the module 300.

FIG. 8 illustrates how the rotatable bail lever 102 rotates from a home, locked or engaged position 102A to a release, stop, or open position 102C. As it does so, the base 122 and the release fork 104 slide out away from the cage or receptacle 610.

Referring now to FIG. 9, a magnified cutaway view along a line in FIG. 8 of a portion of the module 300 and the cage 610 is illustrated. FIG. 9 illustrates how a tip 722 of the tab 620 engages the catch 320 in the right side 321R of the housing 302 to retain the fiber optic module 300 within the cage 610. With the tip 722 of the tab 620 engaged with the catch 320, the fiber optic module 300 is retained within the cage 610 and it is difficult to pull out on the fiber optic module 300 from the cage 610 as indicated in the direction of the arrow 900.

Figure 10A:
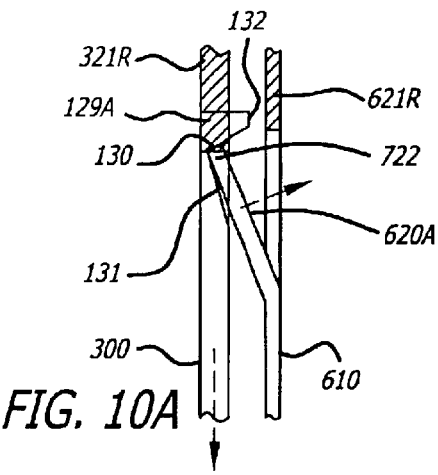
FIGS. 10A–10C are magnified cross sectional views of a portion of FIG. 8 illustrating the right side of the fiber optic module and the right side of the cage or receptacle for various positions of the rotating bail lever delatching mechanism.
Figure 11A:
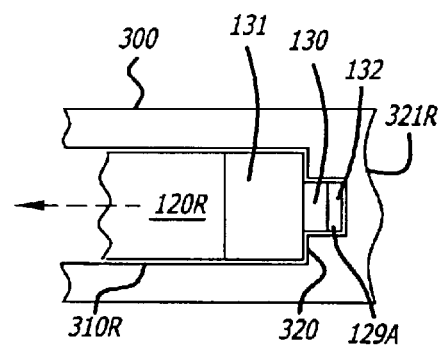
FIGS. 11A–11C are right side views of a portion of the fiber optic for various positions of the rotating bail lever delatching mechanism corresponding respectively to FIGS. 10A–10C.
Figure 10B:
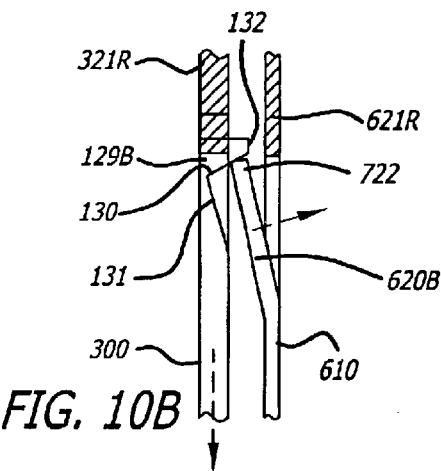
Figure 11B:
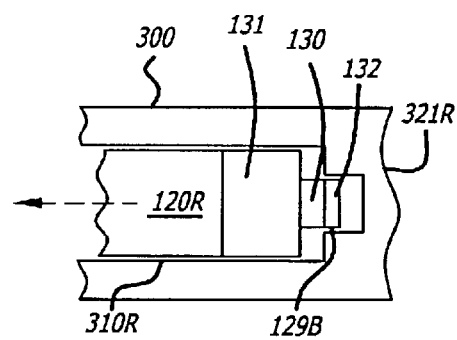
Figure 10C:
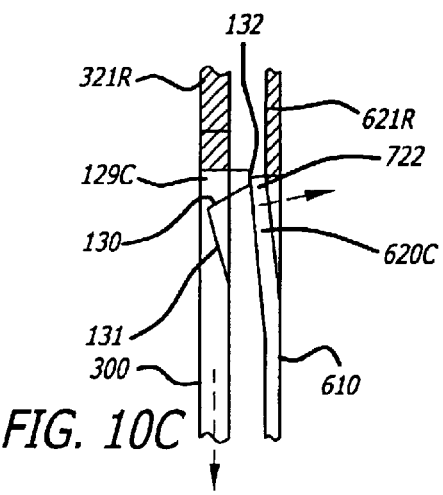
Figure 11C:
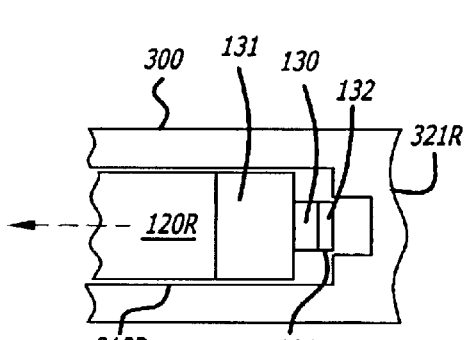

Referring now to FIGS. 10A–10C (referred to collectively as FIG. 10), a magnified cutaway view along the FIG. 10 line in FIG. 8 illustrates a portion of the cage 610 and the module 300 as the release mechanism 100 is operated. FIGS. 11A–11C (referred to collectively as FIG. 11) correspond to FIGS. 10A–10C and illustrate positions of the release fork 104 on a side of the module 300 as the release mechanism is operated.

The operation of the release mechanism 100 is now describe with reference to FIGS. 8, 9, 10 (FIGS. 10A–10C), and 11 (FIGS. 11A–11C). The cam-follower mechanism of the invention translates angular motion of the cam into linear displacement on the follower. In one embodiment, approximately ninety degrees (90°) of angular motion translates into approximately two and two-tenths millimeters (2.2 mm) of linear displacement. In FIGS. 9, 10 and 11, the tab 620 and its illustrated positions are referred to by reference numbers 620A–620C; and the delatching mechanisms 129 and its illustrated positions are referred to by reference numbers 129A–129C.

Referring now to FIG. 8, the fiber optic module 300 is pushed into the cage or receptacle 610 of the host adapter 602 so that its fully inserted and retained therein in an initial state. The bail latch 102 is initially in the locked, engaged or home position 102A. In this locked, engaged or home position 102A, FIGS. 9, 10A, and 11A are illustrative of the release mechanism 100.

Referring to FIG. 9, a portion of the right side or right wall 321R of the fiber optic module 300 is illustrated adjacent to a portion of the right side or right wall 621R of the cage or receptacle 610. To provide a frame of reference, the fiber optic module 300 is removed from the cage or receptacle 610 in the direction of arrow 900. Tab 620 bends inward into the interior of the cage or receptacle 610 to engage the fiber optic module 300. The tab 620 is movable and flexes around the flex line 720. A first portion of the tip 722 of tab 620 engages the catch 320 in the right side 321R of the housing 302 of the fiber optic module 300 to retain it therein. In one embodiment, the first portion is the outer portions of the tip 722. The left side engagement of the left side tab with the left side catch is a mirror image of the right side engagement. That is, a portion of the tip 722 of tab 620 in the left side engages the catch 320 in the left side 321L of the housing of the fiber optic module 300.

Referring now to FIGS. 10A and 11A, the bail latch 102 and the release mechanism 100 is in an initial, home, locked or engaged position 102A. FIG. 10A illustrates another portion of the right side or right wall 321R of the fiber optic module 300 adjacent to a portion of the right side or right wall 621R of the cage or receptacle 610 which illustrates a portion of the release mechanism 100 with the bail latch 102 in its initially locked, engaged or home position 102A. FIG. 11A, corresponding with FIG. 10A, illustrates a portion of a side view of the fiber optic module 300 and corresponding position of the release mechanism 100 when the bail latch 102 is in its initially locked, engaged or home position 102A.

With the bail latch 102 in the locked, engaged or home position 102A, the delatch actuator 129 and the cage tab 620 are in positions 129A and 620A respectively. A second portion of the tip 722 rests near the ramp or wedge 130 of the delatch actuator 129. In one embodiment, the second portion is the inner portion of the tip 722. A portion of the inside surface of the tab 620 may rest against the resting surface 131.

With the bail latch 102 in the locked, engaged or home position 102A, the release mechanism 100 and the delatch actuator 129 allow the tab 620 to engage the catch 320 as is illustrated in FIG. 9. The leaf spring 108 introduces pressure on the bail lever 102 via the post 125 of the delatching fork 104 and the posts 140L–140R of the housing of the module. The pressure provided by the leaf spring 108 keeps the bail lever 102 upright at its home position 102A until overcome by an external force. The leaf spring 108 also helps to ensure firm contact is maintained between the bearing surface 316 and the cam lobe 116 at the pressure point 317 as the cam lobe 116 moves with the bail lever 102 through its phases of motion.

The delatching mechanism 100 is set in motion by a user using one of his/her fingers to rotate the rotatable bail latch 102 from the locked, engaged or home position 102A toward the open, released, or stop position 102C. The cam-follower mechanism translates rotational motion of the bail lever 102 into linear displacement on the delatching fork 104. In this cam-follower system, the cam is an integrated part of the bail lever struts 110L–110R, while the delatching fork 104 is the follower. When the external force is applied by a user on the horizontal bar 112 of the bail lever 102, the cam profile introduces an ellipsoid path to the subsequent phase space of the cam-follower mechanism.

Referring now to FIGS. 10B and 11B, the bail latch 102 is moved to an intermediary position between positions 102A and 102C from that of the illustration of FIGS. 10A and 11A. FIG. 10B illustrates a portion of the right side or right wall 321R of the fiber optic module 300 adjacent to a portion of the right side or right wall 621R of the cage or receptacle 610 which illustrates a portion of the release mechanism 100 with the bail latch 102 in its intermediary position. FIG. 11B, corresponding with FIG. 10B, illustrates a portion of a side view of the fiber optic module 300 and corresponding position of the release mechanism 100 when the bail latch 102 is in its intermediary position.

With the bail latch 102 in the intermediary position, the delatch actuator 129 and the cage tab 620 are in positions 129B and 620B, respectively. The second portion of the tip 722 rides up the ramp or wedge 130 of the delatch actuator 129 at position 129B forcing the tab 620 outward away from the catch 320 in the fiber optic module 300 to position 620B. No portion of the inside surface of the tab 620 rests against the resting surface 131. FIG. 11B illustrates the intermediary position of the release mechanism and the bail latch 102. In the intermediary position, the tip 722 may have not yet completely cleared the catch 320 of the fiber optic module 300.

Referring now to FIGS. 10C and 11C, the rotatable bail latch 102 is moved to the open, released, or stop position 102C from that of the intermediary position illustrated by FIGS. 10B and 11B. FIG. 10C illustrates a portion of the right side or right wall 321R of the fiber optic module 300 adjacent to a portion of the right side or right wall 621R of the cage or receptacle 610 which illustrates a portion of the release mechanism 100 with the bail latch 102 in its final, open, released, or stop position. FIG. 11C, corresponding with FIG. 10C, illustrates a portion of a side view of the fiber optic module 300 and corresponding position of the release mechanism 100 when the bail latch 102 is in its final position.

With the bail latch 102 in the final position, the delatch actuator 129 and the cage tab 620 are in positions 129C and 620C, respectively. The second portion of the tip 722 rides up past the ramp or wedge 130 onto the crown 132 of the delatch actuator 129 at position 129C forcing the tab 620 further outward away from the catch 320 in the fiber optic module 300 to position 620C. In this position, no portion of the inside surface of the tab 620 rests against the resting surface 131. The tip 722 and the tab 620 are completely disengaged by the delatch actuator 129 from the catch 320 of the fiber optic module 300 in the final position 102C.

That is, in the final position 102C, the tip 722 has completely cleared the catch 320 of the fiber optic module 300 so that the fiber optic module can be pulled out from the cage or receptacle 610 by a user. With the lever 102 in the final position 102C, an end user may wrap a finger around the handle 112 or grip any exterior surface of the fiber optic module 300 in order to pull it out and free it from the cage or receptacle 610.

As the rotatable bail latch 102 is moved toward the open, released, or stop position 102C, the bail lever struts 110L–110R come to rest when they hit respective left and right stop pads 123L–123R of the left side stop 124L and the right side stop 124R, respectively. This stops the rotatable bail latch 102 at its maximum angle of rotation. In one embodiment, the maximum angle of rotation of the rotatable bail latch 102 from position 102A to position 102C is approximately ninety degrees (90°). In this one embodiment, with the bail lever 102 at position 102C, the delatching fork 104 completes a linear displacement of approximately two and two-tenths of a millimeter (2.2 mm) in linear displacement along the sides of the fiber optic module.

When the external force applied by the user on the horizontal bar 112 of the bail lever 102 is released, the bail lever 102 may be returned to the home position 102A (also referred to as "homing") by the force of the leaf spring 108. Alternatively, homing of the bail lever 102 can be achieved by a combination of an external force, such as that introduced by a users finger, and the tension from the leaf spring 108.

To prevent obstruction of fiber patchcord 601, the bail lever 102 is preferably kept in its upright, closed, locked, engaged, initial, home, or latched position 102A as illustrated in FIG. 6. With the fiber patchcord 601 plugged into the module and the module plugged into the host adapter, the module can perform its desired electrical/optical function. To unplug the fiber optic module 300 from the host adapter 602, the fiber patch cord 601 is unplugged or removed from the fiber optic plug receptacle of the fiber optic module 300. The bail lever is then rotated and lowered to its horizontal, final, released, open, or disengaged position 102C. Rotating the bail lever 102 to its position 102C applies a linear motion on the delatching actuators 129. In position 102C, the catches 320 of the fiber optic module 300 are free from the mechanical engagement with the cage 102C. The fiber optic module 300 can then be pulled out from the cage or receptacle 610.

In this manner, the rotation angular motion of the bail lever 102 is not lost but transformed into useful work done, the linear displacement of the delatching fork and its delatching actuators. Once the rotational motion of the bail lever 102 is substantially complete, the fiber optic module 300 is released or disengaged from the cage 610.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. While the invention has been described in particular embodiments, the invention should not be construed as limited by such embodiments. Rather, the invention should be construed according to the claims that follow below.

What is claimed is:

1. A release mechanism for pluggable fiber optic modules, the release mechanism comprising:
a release fork having a pair of sliding actuators and a base coupled there-between, the pair of sliding actuators including a pillar at one end coupled to the base and a delatching mechanism at another end, the delatching mechanism to push out on a tab of a cage to delatch a fiber optic module therefrom;
a pin coupled to the pillar, the pin having a shank extending out from the pillar; and
a rotatable lever arm having an end with an elliptical cam lobe and a circular opening to accept the pin, the lever arm to rotate about the pin such that the cam lobe pushes against a bearing surface to cause the pair of sliding actuators to slide and the delatching mechanism to push out on the tab of the cage to delatch the fiber optic module therefrom.

2. The release mechanism of claim 1, wherein
the delatching actuator includes a ramp and a crown to push out on the tab of the cage to delatch the fiber optic module therefrom.

3. The release mechanism of claim 2, further comprising:
a leaf spring coupled to the base, the leaf spring to push back against the rotatable lever arm and return it to a home position.

4. The release mechanism of claim 1, wherein
the rotatable lever arm is a rotatable bail lever having a pair of struts and a handle bar coupled there-between.

5. A fiber optic module comprising:
a housing having a pair of pins in a bottom side, the housing further having one or more optical plug receptacles in a front side, an opening in a back side, and a pair of side openings forming a catch in each side, the catch in each side to receive a side tab in each side of a cage to retain the fiber optic module therein, the one or more optical plug receptacles to receive one or more fiber optic cable plugs;
a printed circuit board mounted in the housing, the printed circuit board at one end including one or more electro-optic transducers to convert optical signals into electrical signals or electrical signals into optical signals, the printed circuit board at another end including an edge connection aligned with the opening in the back side of the housing to couple to a connector of a host, the printed circuit board further including one or more integrated circuits electrically coupled between the edge connection and the one or more electro-optic transducers; and
a cam follower release mechanism movably coupled to the housing to release the fiber optic module from the cage using a rotational action, the cam follower release mechanism including
a rotatable lever including a cam portion at one end and an opening about which the cam portion may rotate,
a fork including a base and a pair of pillars with a pair of side sliding actuators coupled respectively thereto, each of the pair of side sliding actuators including a delatching actuator, the base further including a bearing surface to support the cam portion of the rotatable lever, the pair of side sliding actuators to slide along the respective pair of side openings in the housing in response to rotation action of the rotatable lever and the delatching actuators to push out on the side tabs of the cage to release the fiber optic module there-from, and
a pin coupled to one of the pair of pillars, the opening in the rotatable lever rotatably coupled over the pin, the pin to allow the rotatable lever to rotate between a first position and a second position to release the fiber optic module from the cage.

6. The fiber optic module of claim 5, wherein
the base further includes a stop to limit the angle of rotation of the rotatable lever.

7. The fiber optic module of claim 5, wherein
the rotatable lever includes a pair of rotatable levers coupled together by a handlebar at a first end, each of the pair of rotatable levers includes the cam portion at a second end opposite the first end and the opening about which the cam portion may rotate.

8. The fiber optic module of claim 5, wherein the cam release mechanism further includes
a leaf spring coupled between the base and the housing, the leaf spring to moveably couple the cam release mechanism to the housing and to return the rotatable lever to the first position.

9. A system comprising:
a host adapter, the host adapter including
a host printed circuit board,
an edge connector coupled to the host printed circuit board,
a hollow cage coupled to the host printed circuit board over the edge connector near a rear end, the hollow cage including an opening at a front end into an interior portion and a pair of flexible tabs in respective left and right side walls, the pair of flexible tabs bent into the interior portion of the hollow cage to latch with catches in respective left and right sides of a fiber optic module; and
the fiber optic module to couple to the host adapter, the fiber optic module including
a housing with the catches in respective left and right sides thereof, the housing further including openings in respective left and right sides to accept a pair of slide actuators with delatch actuators at one end, the housing further including a fiber optic plug receptacle in a front side, the housing further including a pair of posts in a bottom side to couple to a leaf spring,
a printed circuit board mounted in the housing, the printed circuit board including one or more opto-electronic devices to transduce between electrical and optical signals, and an edge connection to couple electrical signals between the host printed circuit board and the one or more opto-electronic devices, and
a cam-follower release mechanism moveably coupled to the housing to release the tabs of the cage from the catches of the housing, the cam-follower release mechanism comprising
a moveable base moveably coupled around the housing, the moveable base including a spring retention post, the moveable base further including a pair of bearing surfaces, the moveable base further including the pair of slide actuators with delatch actuators at the end, the pair of slide actuators slideably coupled into the openings in the left and right sides of the housing, a pair of pins having one end coupled to the moveable base, each of the pair of pins further having a pivot rod extending from the moveable base, a rotatable bail lever having a pair of lever arms with openings rotatably coupled over the pair of pins, the pair of lever arms coupled together at a first end by a handle bar, each of pair of lever arms including a cam lobe at a second end opposite the first end, the cam lobe of each pair of lever arms to moveably couple to the respective pair of bearing surfaces of the moveable base, the rotatable bail lever to rotate around the pair of pins from a latch position where the tabs of the cage engages the catches of the fiber optic module to a release position where the tabs of the cage are disengaged from the catches of the fiber optic module, and a leaf spring coupled between the spring retention post of the moveable base and the posts in the bottom side of the housing, the leaf spring to retain the moveable base moveably coupled around the housing and return the rotatable bail lever to the latch position from the release position.

10. The system of claim 9, wherein the cam lobe of each pair of lever arms is an elliptical cam lobe.

11. A fiber optic module comprising:

a printed circuit board including one or more opto-electronic devices at one end, an edge connection at an opposite end, and one or more integrated circuits electrically coupled between the edge connection and the one or more opto-electronic devices;

a housing around the printed circuit board, the housing having a top side, a bottom side, a right side and a left side, the housing having one or more optical plug receptacles in the front side to receive one or more optical plugs of a fiber optic cable in alignment with the one or more optoelectronic devices, the housing further having a pair of openings forming catches in the right side and the left side, the catches in the right side and the left side to engage tabs in a right side and a left side of a cage to retain the fiber optic module therein; and a release mechanism moveably coupled to the front side of the housing between a latch position and a release position, the release mechanism to move from the latch position to the release position using a rotational action and release the fiber optic module from the cage, the release mechanism including a rotational cam mechanism including a rotatable cam portion and a rotatable lever portion, the rotatable cam portion moveably coupled to the front side of the housing, the rotational cam mechanism to receive the rotational action, a follower mechanism moveably coupled to the rotational cam mechanism to translate the rotational action into a linear action, the follower mechanism including a pair of delatch actuators each having a ramp, the ramps in the pair of pair of delatch actuators to release the tabs of the right side and the left side of the cage from the catches in the right side and left side of the housing to release the fiber optic module from the cage in response to the linear action of the follower mechanism translated from the rotational action of the rotational cam mechanism, and a spring mechanism coupled between the release mechanism and the housing, the spring mechanism to generate tension between the housing and the release mechanism to return the release mechanism to the latch position such that the tabs of the cage can engage the catches of the fiber optic module.

12. The fiber optic module of claim 11, wherein the rotatable cam portion is an elliptical cam lobe.

13. The fiber optic module of claim 11, wherein the spring mechanism is a leaf type spring.

14. The fiber optic module of claim 11, wherein the follower mechanism is a fork including a pair of side slide actuators respectively with the pair of delatch actuators.

15. A method of removing a fiber optic module from within a cage, the method comprising:

rotating a bail release lever of the fiber optic module from a first position to a second position to generate a rotational motion in a cam lobe about a pivot point;

translating the rotational motion of the cam lobe into a linear pulling motion of a sliding side release mechanism of the fiber optic module; and pushing out on a side tab of the cage to release the side tab from a side catch of the fiber optic module.

16. The method of claim 15, wherein the sliding side release mechanism includes a delatching actuator with a ramp to push out on the side tab of the cage.

17. The method of claim 15, further comprising:

pulling out on the fiber optic module away from the cage such that the side tab of the cage slides over the side catch of the fiber optic module.

18. The method of claim 15, wherein the sliding side release mechanism is a pair of sliding side release mechanisms, the fiber optic module includes a pair of side catches, and the pushing out on the side tab includes pushing out on a pair of side tabs to release them from the pair of side catches of the fiber optic module.

19. The method of claim 15, wherein the sliding side release mechanism is a linear follower of the cam lobe.

20. The method of claim 15, further comprising:

after pushing out on the side tab of the cage to release the side tab from the side catch of the fiber optic module, returning the bail release lever of the fiber optic module to the first position from the second position.

* * * * *

UNITED STATES PATENT AND TRADEMARK OFFICE
CERTIFICATE OF CORRECTION

PATENT NO. : 6,851,867 B2
DATED : February 8, 2005
INVENTOR(S) : Pang et al.

It is certified that error appears in the above-identified patent and that said Letters Patent is hereby corrected as shown below:

<u>Column 5,</u>
Line 31, please delete the entire paragraph "FIG. 2B is a right side view of the elements of the rotating bail lever delatching mechanism for side latches of a fiber optic module in an open or released position.".

Signed and Sealed this

First Day of November, 2005

JON W. DUDAS
*Director of the United States Patent and Trademark Office*